(12) United States Patent
Wu et al.

(10) Patent No.: US 12,123,585 B1
(45) Date of Patent: Oct. 22, 2024

(54) SILICONE CO-EXTRUSION METHOD FOR LED LIGHT STRIP, MOLD AND ITS EXTRUSION STRUCTURE

(71) Applicant: Signcomplex Limited, Shenzhen (CN)

(72) Inventors: Tiejun Wu, Shenzhen (CN); Hailong Zhu, Shenzhen (CN); Ji'an Wei, Shenzhen (CN); Wenhai Liu, Shenzhen (CN); Wenmao Wei, Shenzhen (CN); Yongbo Zhu, Shenzhen (CN)

(*) Notice: Subject to any disclaimer, the term of this patent is extended or adjusted under 35 U.S.C. 154(b) by 0 days.

(21) Appl. No.: 18/401,562

(22) Filed: Dec. 31, 2023

(30) Foreign Application Priority Data

Sep. 28, 2023 (CN) .......................... 202311292794.9
Sep. 28, 2023 (CN) .......................... 202322677238.5

(51) Int. Cl.
*F21V 3/06* (2018.01)
*B29C 48/00* (2019.01)
*B29C 48/03* (2019.01)
*B29C 48/154* (2019.01)
*B29C 48/78* (2019.01)
(Continued)

(52) U.S. Cl.
CPC .......... *F21V 3/0625* (2018.02); *B29C 48/022* (2019.02); *B29C 48/03* (2019.02); *B29C 48/154* (2019.02); *B29C 48/78* (2019.02); *F21S 4/26* (2016.01); *F21V 9/40* (2018.02); *B29K 2083/00* (2013.01); *B29L 2031/747* (2013.01); *F21Y 2103/10* (2016.08); *F21Y 2113/00* (2013.01); *F21Y 2115/10* (2016.08)

(58) Field of Classification Search
CPC .. F21V 3/0625; F21V 9/40; F21S 4/26; B29C 48/022; B29C 48/78; B29C 48/154; B29C 48/03
See application file for complete search history.

(56) References Cited

U.S. PATENT DOCUMENTS

| | | | |
|---|---|---|---|
| 2015/0145406 A1* | 5/2015 | Li | F21K 9/232 264/1.7 |
| 2019/0277476 A1* | 9/2019 | Crompvoets | F21S 4/28 |
| 2020/0025343 A1* | 1/2020 | Labas | F21S 4/22 |

* cited by examiner

*Primary Examiner* — Evan P Dzierzynski
*Assistant Examiner* — Nathaniel J Lee (57) ABSTRACT

A silicone co-extrusion method for LED light strip, a mold and its extrusion structure are provided and it relates to the technical field of light strip packaging. The silicone co-extrusion method for LED light strip comprises the following steps: Obtaining an elongated adhesive material, the elongated adhesive material comprises a light blocking adhesive material and a diffusion adhesive material; Feeding the light blocking adhesive material, the diffusion adhesive material and a circuit board with a light bead into a light blocking adhesive material channel, a diffusion adhesive material channel and a circuit board channel in a mold, respectively, and extruding the fed light blocking adhesive material and diffusion adhesive material by means of silicone co-extrusion to a silicone light bar outlet to realize forming the light blocking adhesive material and diffusion adhesive material on the circuit board to obtain a silicone light bar; Heating and shaping the silicone light bar extruded from the mold to obtain the LED light strip, wherein the light blocking adhesive material channel, the diffusion adhesive material channel and the circuit board channel are connected to the silicone light bar outlet. The mold in the present disclosure is used to implement the above method, and the LED light strip obtained has good uniformity of emission.

19 Claims, 11 Drawing Sheets

(51) Int. Cl.
 *B29K 83/00* (2006.01)
 *B29L 31/00* (2006.01)
 *F21S 4/26* (2016.01)
 *F21V 9/40* (2018.01)
 *F21Y 103/10* (2016.01)
 *F21Y 113/00* (2016.01)
 *F21Y 115/10* (2016.01)

SILICONE CO-EXTRUSION METHOD FOR LED LIGHT STRIP, MOLD AND ITS EXTRUSION STRUCTURE

TECHNICAL FIELD OF THE INVENTION

The present disclosure relates to the technical field of light strip packaging, in particular to a silicone co-extrusion method for LED light strip, a mold and its extrusion structure.

BACKGROUND OF THE INVENTION

LED strip light (or lamp strip) in the market has a wide range of applications, such as: furniture, cabinets, home decoration, commercial premises display, transportation decoration, toy decoration, etc., in the courtyard, stage performances also have an irreplaceable role.

Currently on the market in the production process of LED light strip package usually use dispensing glue (adhesive), with epoxy resin to protect the LED core and welding line, the shape of the gel (glue) after curing directly affects the brightness, light-emitting efficiency and light-emitting uniformity of the finished product of the light source. By using of COB or CSP inverted LED flexible light strip, there are problems: a low light-emitting efficiency, uniformity of the general, and very narrow space or weather-resistant space cannot be continued to use. The time of curing gel process of Surface Mounted Devices (SMD) in the prior art is long, the uniformity is difficult to ensure and the production length is also limited.

In addition, the colored and scattered licht of the existing LED light strip is achieved by adding a tinted film and lens on the light strip, there are problems such as complex processing, increased thickness or brightness reduction.

SUMMARY OF THE INVENTION

In view of this, the present disclosure provides a technical solution of a silicone (or silica gel) co-extrusion method for LED light strip, a mold and its extrusion structure.

In a first aspect, the present disclosure provides a silicone co-extrusion method for LED light strip, comprising the following steps:

Obtaining an elongated adhesive material, the elongated adhesive material comprising a light blocking adhesive material and a diffusion adhesive material;

Feeding the light blocking adhesive material, diffusion adhesive material, and a circuit board with a light bead into a light blocking adhesive material channel, a diffusion adhesive material channel, and a circuit board channel in a mold, respectively, and extruding the fed light blocking adhesive material and diffusion adhesive material by means of silicone co-extrusion to a silicone light bar outlet to realize forming the light blocking adhesive material and diffusion adhesive material on the circuit board to obtain a silicone light bar;

Heating and shaping the silicone light bar extruded from the mold to obtain an LED light strip, wherein the mold has a light blocking adhesive material channel, a diffusion adhesive material channel, a circuit board channel and a silicone light bar outlet, wherein the light blocking adhesive material channel, the diffusion adhesive material channel, and the circuit board channel are connected to the silicone light bar outlet.

In a second aspect, the present disclosure provides a silicone co-extrusion mold for LED light strip, comprising a co-extrusion section and a circuit board feeding section, the co-extrusion section being provided with a light blocking adhesive material channel, a diffusion adhesive material channel, and a silicone light bar outlet; the light blocking adhesive material channel and the diffusion adhesive material channel being provided on a mounting surface of the co-extrusion section, the silicone light bar outlet is set on an output surface of the co-extrusion section; the circuit board feeding section is vertically connected to the mounting surface of the co-extrusion section, the interiors of the circuit board feeding section and the co-extrusion section are provided with a circuit board channel, and the circuit board channel is perpendicular to the mounting surface and runs through the circuit board feeding section and the co-extruding section; the light blocking adhesive material channel, the diffusion adhesive material channel, and the circuit board channel all are in mounting positions which are before the silicone light bar outlet, and by means of co-extrusion, the light blocking adhesive material, the diffusion adhesive material, and the circuit board are co-extruded to form the silicone light bar at the silicone light bar outlet.

In a third aspect, the present disclosure provides an surface mounted extrusion structure for LED light strip, characterized in that it comprises:
at least one LED light bead;
a lamp plate, for supplying power to the LED light bead to realize the lighting of the at least one LED light bead;
a light blocking silicone part, for realizing blocking the propagation of light at least at a certain angle when the LED light bead is lit;
a light transmitting silicone part, for realizing the scattering of light propagation to the outside world at least at a certain angle when the LED light bead is lit, wherein the light transmitting silicone part is made of a colored silicone;
Wherein, the light blocking silicone part and the light transmitting silicone part are integrally connected, and the light blocking silicone part and the light transmitting silicone part are enclosed to form a cavity accommodating the lamp plate and the at least one LED lamp bead.

Relative to the prior art, the present disclosure has at least the following beneficial effects:

(1) The fed light blocking adhesive material and diffusion adhesive material are co-extruded with silicone to achieve that the light blocking adhesive material and the diffusion adhesive material are formed on the circuit board to obtain a silicone light bar, and the silicone light bar extruded from the mold is heated and shaped to obtain an LED light strip, which can reduce the time of curing the gel, and make the luminous uniformity of the LED light strip better;

2) The length of the LED light strip obtained is also greatly improved due to the use of silicone co-extrusion;

3) The mold in the embodiments of the present disclosure has a vertically disposed co-extrusion section and a circuit board feeding section, which can ensure the stability of the circuit board feeding, and can make the silicone stably formed on the circuit board during the process of silicone co-extrusion;

4) The provision of air inlet holes on the circuit board feeding section can prevent inflation during the co-extrusion process to avoid possible collapse of the hollow position in the silicone light bar.

5) The surface mounted extrusion structure in the embodiments of the present disclosure, by setting the light transmitting silicone part and the light blocking silicone part as a one-piece structure, has a better and more concise appearance that looks better overall, and can realize the collection of tinting and scattering in a single unit, and can be installed and used in an extremely narrow and short space (e.g., the narrowest 3 mm, the shortest 2.5 mm), the light emitting is more uniform, and the light-emitting efficiency is improved, and the thickness is thinner than the traditional process

BRIEF DESCRIPTION OF THE DRAWINGS

The foregoing and other purposes, features and advantages of the present disclosure are made clearer by the following description of embodiments of the present disclosure with reference to the accompanying drawings, in the accompanying drawings.

DETAILED DESCRIPTION OF THE PREFERRED EMBODIMENT

The present disclosure is described below based on embodiments, but it is worth stating that the present disclosure is not limited to these embodiments. In the following detailed description of the present disclosure, some specific detailed portions are exhaustively described. However, the present disclosure can also be fully understood by a person skilled in the art with respect to the parts that are not exhaustively described.

In addition, persons of ordinary skill in the art should understand that the accompanying drawings are provided only to illustrate the purposes, features, and advantages of the present disclosure, and the accompanying drawings are not actually drawn to scale.

At the same time, unless the context clearly requires otherwise, the words "including", "comprising", and the like throughout the specification and the claims should be interpreted to mean inclusive rather than exclusive or exhaustive; that is to say, it means "including but not limited to".

Figure 1:
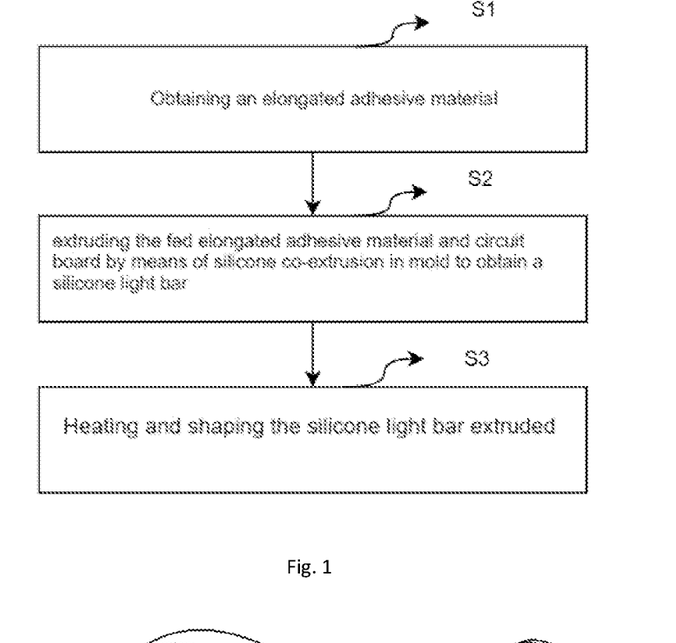
FIG. 1 is a flowchart of a silicone co-extrusion method for LED light strips in embodiments of the present disclosure.

As shown in FIG. 1, the embodiment of the present disclosure provides a silicone co-extrusion method for LED light strip, comprising the following steps:

S1, obtaining an elongated adhesive material, the elongated adhesive material comprising a light blocking adhesive material and a diffusion adhesive material;

S2, feeding the light blocking adhesive material, diffusion adhesive material, and a circuit board with a light bead into a light blocking adhesive material channel 101, a diffusion adhesive material channel 102, and a circuit board channel 201 in a mold, respectively, and extruding the fed light blocking adhesive material and diffusion adhesive material by means of silicone co-extrusion into a silicone light bar outlet 103 to realize forming the light blocking adhesive material and diffusion adhesive material on the circuit board to obtain a silicone light bar;

S3, heating and shaping the silicone light bar extruded from the mold to obtain the LED light strip, wherein the mold has a light blocking adhesive material channel 101, a diffusion adhesive material channel 102, a circuit board channel 201, and a silicone light bar outlet 103, wherein the light blocking adhesive material channel 101, the diffusion adhesive material channel 102, and the circuit board channel 201 are connected to the silicone light bar outlet 103.

Wherein, the light blocking adhesive material in S1 can be selected as a light-impermeable silicone material, for example, a material with fire protection characteristics UL94V0, V1, V2 grade or UL94HB grade, and the hardness is selected as Shore A30-90 hardness grade to satisfy different mechanical strength and deformation requirements; the flame retardant characteristics can be limited as follows: for samples from 3 mm to 13 mm thick, the combustion speed is less than 40 mm per minute; for samples less than 3 mm thick, the burning speed is less than 70 mm per minute. The light blocking adhesive material is made to have better weather resistance and safety protection properties.

Wherein, the diffusion adhesive material in S1 is a light-transmissive silicone material, for example, a transparent silicone or a colored translucent silicone with a refractive index of 83-98% can be used; achieving a better light output.

As one of the embodiments, obtaining the elongated adhesive material comprises: fully mixing a vulcanizing agent with the silicone raw material to obtain the refining adhesive; and cutting the refining adhesive into elongated strips to form the elongated adhesive material;

Preferably, the diffusion adhesive material is obtained by mixing transparent silicone and colored additives to achieve different color combinations, and different color combinations can be achieved by combining the color of the light blocking silicone, for example, a combination of white opaque light blocking silicone and transparent diffusion silicone, a combination of white opaque light blocking silicone and milky-white semi-transparent diffusion silicone, a combination of black opaque light blocking silicone and milky-white silicone and grey translucent diffusion silicone, a combination of brown opaque light blocking silicone and brown translucent diffusion silicone, and the like, in order to present a diverse combination of LED light strips that can be integrated with the corresponding space in home, furniture, props, and other applications.

As an optional embodiment, the heating and shaping the silicone light bar extruded from the mold to obtain the LED light strip in S3 comprises:

entering the silicone light bar into the tunnel oven for heating to achieve vulcanization and shaping to obtain the LED light strip. Wherein, the length and temperature of the tunnel oven can be adjusted according to the actual situation, for example, a tunnel oven having 20 meters long and a heating temperature of 170 degrees Celsius can be used to achieve better vulcanization and shaping, so that the time for curing the gel can be reduced, and the luminous uniformity of the LED light strip is good, the heat resistance and cold resistance are good, and the silicone gel in the obtained LED light strip can be used in the environment within the temperature range of 50 degrees Celsius to 250 degrees Celsius, i.e. from 50° C. to 250° C.

As an optional embodiment, while feeding the light blocking adhesive material, diffusion adhesive material and circuit board with light beads into the light blocking adhesive material channel 101, the diffusion adhesive material channel 102 and the circuit board channel 201 in the mold, respectively, it is necessary to expose the cutting line at the bottom of the circuit board in order to facilitate the cutting of the LED light strip, and thus this can be achieved in the following manner: feeding a transparent cutting line adhesive material (e.g., a transparent latex) into the cutting line adhesive material channel 108 in the mold to achieve forming the transparent cutting line adhesive material on the bottom of the circuit board to facilitate seeing the cutting line on the bottom of the circuit board. The LED light strip can be cut to the length desired by the customer in a subsequent step.

As an optional embodiment, the fed light blocking adhesive material and diffusion adhesive material in S2 are extruded to the silicone light bar outlet 103 by means of silicone co-extrusion, wherein the silicone light bar outlet 103 has previously been able to bring the light blocking adhesive material and the diffusion adhesive material and the like into the mounting position, where they and the input circuit board are co-extruded from the silicone light bar outlet 103 under the co-extruding extrusion effect to form silicone light bars. Since the silicone light bar is made of all silicone threads, it is softer and more corrosion-resistant than other materials, and is also resistant to ultraviolet rays, and can achieve a waterproof rating of IP68, and can be used in swimming pools and other use scenarios.

Figure 2:
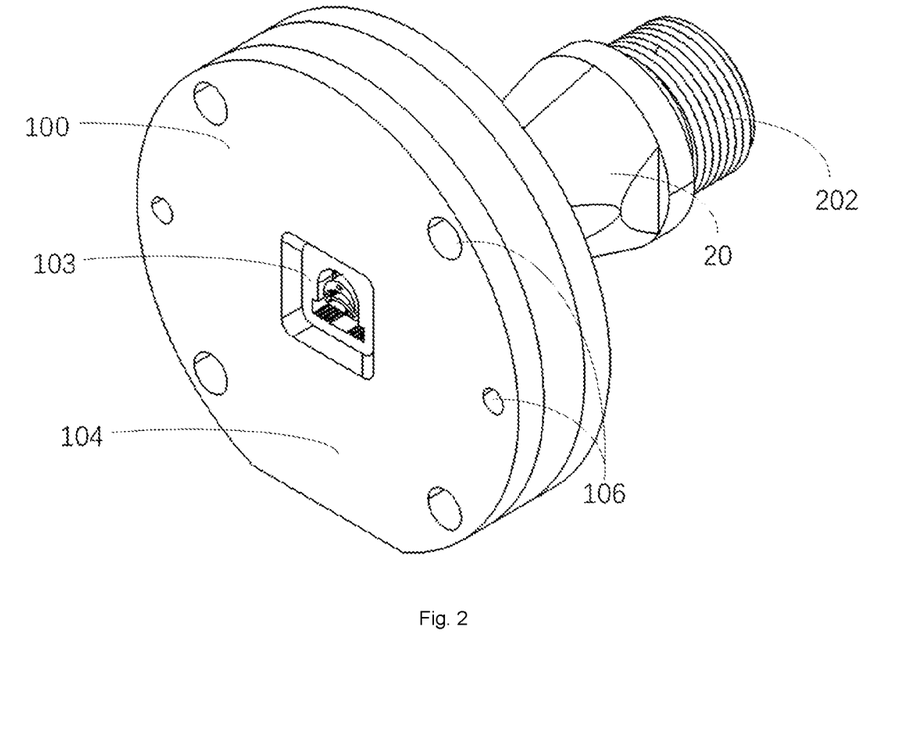
FIG. 2 is a schematic view of the output surface structure of a silicone co-extrusion mold for LED light strips in embodiments of the present disclosure.
Figure 3:
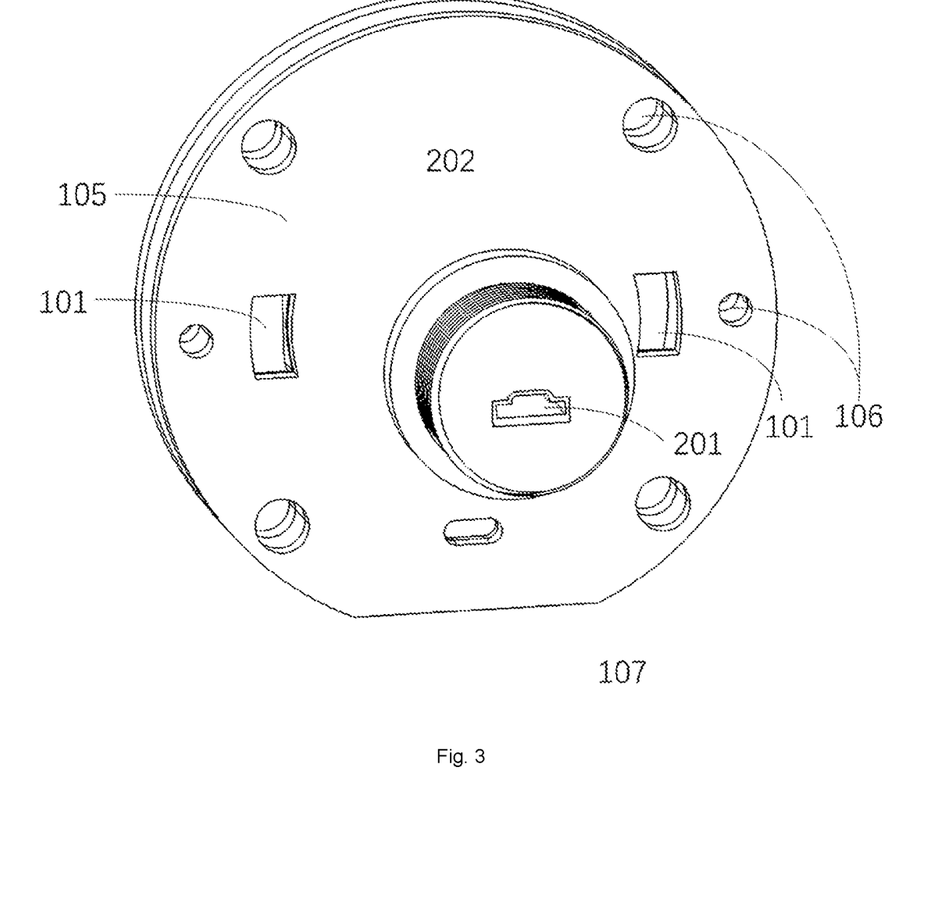
FIG. 3 is a structure schematic view of a mounting surface of the silicone co-extrusion mold for LED light strip in embodiments of the present disclosure.

As another aspect of the embodiments of the present disclosure, there is also provided a silicone co-extrusion mold for LED light strips, as shown in FIGS. 2 and 3, comprising a co-extrusion section 100 and a circuit board feeding section 20, the co-extrusion section 100 being provided with a light blocking adhesive material channel 101, a diffusion adhesive material channel 102, and a silicone light bar outlet 103; the light blocking adhesive material channel 101, diffusion adhesive material channel 102 being provided on a mounting surface 105 of the co-extrusion section 100, the silicone light bar outlet 103 is set on the output surface 104 of the co-extrusion section 100; the circuit board feeding section 20 is vertically connected to the mounting surface 105 of the co-extrusion section 100, the interiors of the circuit board feeding section 20 and the co-extrusion section 100 are provided with a circuit board channel 201, and the circuit board channel 201 is perpendicular to the mounting surface 105 and runs through the circuit board feeding section 20 and the co-extruding section 100; the light blocking adhesive material channel 101, diffusion adhesive material channel 102, and circuit board channel 201 all are in mounting positions before reaching the silicone light bar outlet 103, and by means of co-extrusion, the light blocking adhesive material, the diffusion adhesive material, and the circuit board are co-extruded to form the silicone light bar at the silicone light bar outlet 103.

The above mold in the present disclosure embodiment has a great improvement in the length of the LED light strip obtained due to the use of the silicone co-extrusion method, the LED light strip has a better luminous uniformity, and the thickness of the LED light strip obtained by the above method is able to reach 1.5±0.3 mm, and the light transmittance rate is able to reach 90%. The mold has a vertically set co-extrusion section 100 and a circuit board feeding section 20, which can ensure the stability of the circuit board feeding, and can make the silicone stably form on the circuit board during the co-extrusion process of the silicone.

As a preferred embodiment, the circuit board feeding section 20 also has an air inlet hole 203 connected to the silicone light bar outlet 103, and the air inlet hole 203 is provided to prevent inflation during the co-extrusion process, so as to avoid possible collapse of the hollow position in the silicone light bar, wherein the air inlet holes 203 can be provided together with the circuit board channel 201, or separately.

As a preferred embodiment, one end of the circuit board feeding section 20 away from the co-extrusion section 100 is provided with an external thread 202, the external thread 202 can be used for connecting a head (not shown) for feeding adhesive material, and another end of the head is connected to a refining adhesive equipment (not shown), wherein the light blocking adhesive material and diffusion adhesive material can be obtained through the refining adhesive equipment.

As a preferred embodiment, the circuit board feeding section 20 is provided with an insertion structure 204 inserted into the co-extrusion section 100 and reaching the silicone light bar outlet 103 at one end near the co-extrusion section 100.

As a preferred embodiment, the mounting surface 105 of the co-extrusion section 100 is also distributed with threaded holes 106 running through to the output surface 104 to fix the co-extrusion section 100, so as to facilitate mounting of the co-extrusion section 100 on the production line frame or at the entrance of the tunnel oven.

Figure 4:
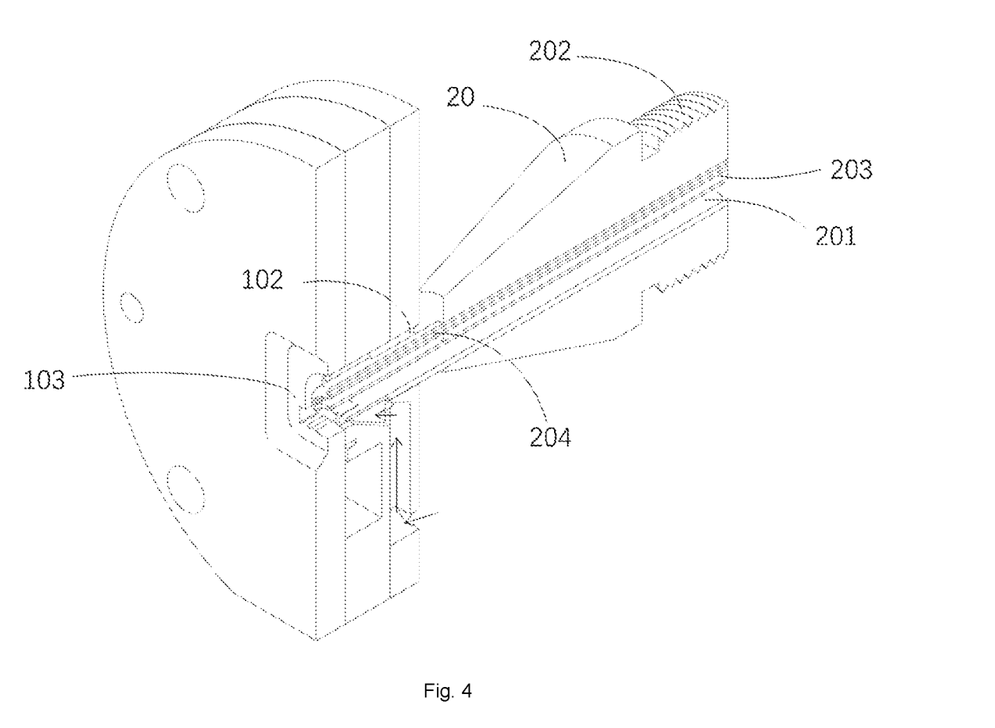
FIG. 4 is a structure schematic view of the overall sectional of the silicone co-extrusion mold for LED light strip in the embodiment of the present disclosure.
Figure 5:
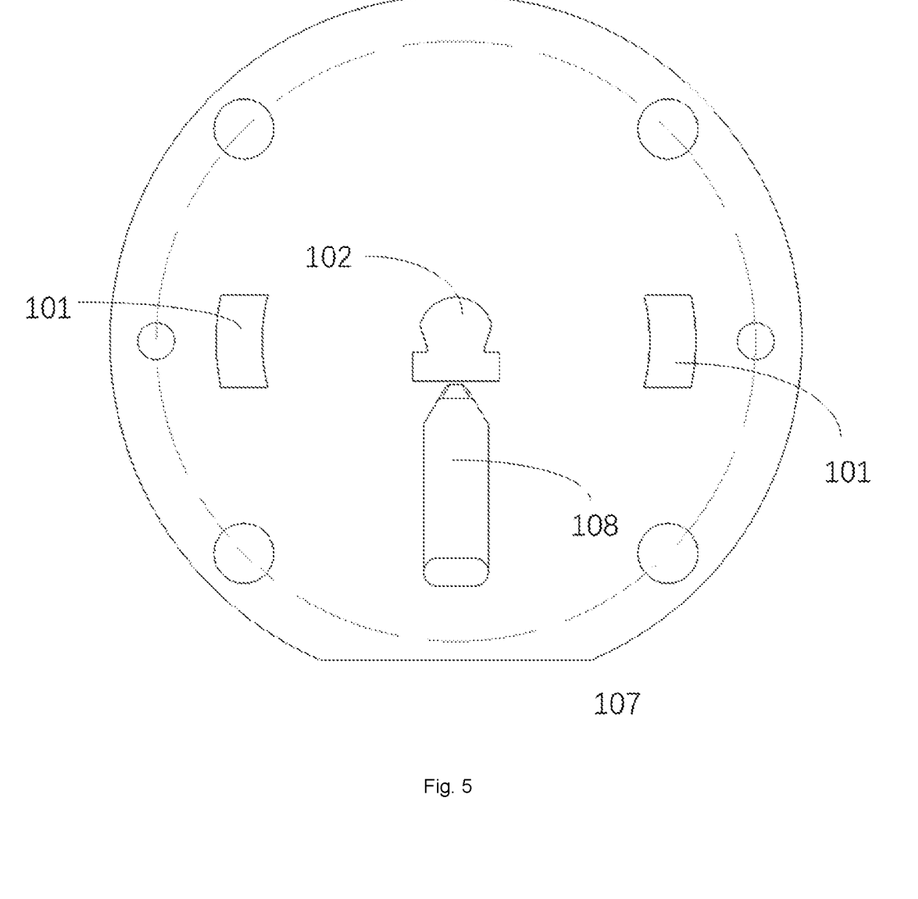
FIG. 5 is a structure schematic view of a second sectional of the silicone co-extrusion mold for LED light strip in an embodiment of the present disclosure regarding the cutting line adhesive material inlet connection.

As a preferred embodiment, as shown in FIG. 5, a second sectional structural schematic view of the embodiment of the present disclosure with respect to the cutting line adhesive material inlet 107 connectivity is shown, the second sectional structural schematic view is a sectional view of the extrusion portion in the plane where the cutting line adhesive material channel 108 is located, so that the cutting line adhesive material channel 108 can be seen. A cutting line adhesive material inlet 107 is also disposed on the mounting surface 105 of the co-extrusion portion 100, the cutting line adhesive material inlet 107 is connected to the mounting position to realize mounting on the bottom of the circuit board during co-extrusion, so that transparent cutting line adhesive material can enter the mounting position through the cutting line adhesive material inlet 107 and then be mounted on the bottom of the circuit board, and it is possible to see the cutting line on the bottom of the circuit board through the transparent cutting line adhesive material so as to facilitate the subsequent cutting of the strip lights. As shown in FIG. 4, the arrows illustrate the path of the cutting line adhesive material channel 108, the transparent cutting line adhesive material enters from the cutting line adhesive material inlet 107 and rises to a certain height, and then rises through an inclined surface and passes near the bottom surface of the circuit board channel 201 to facilitate mounting to the bottom surface of the circuit board.

Figure 6:
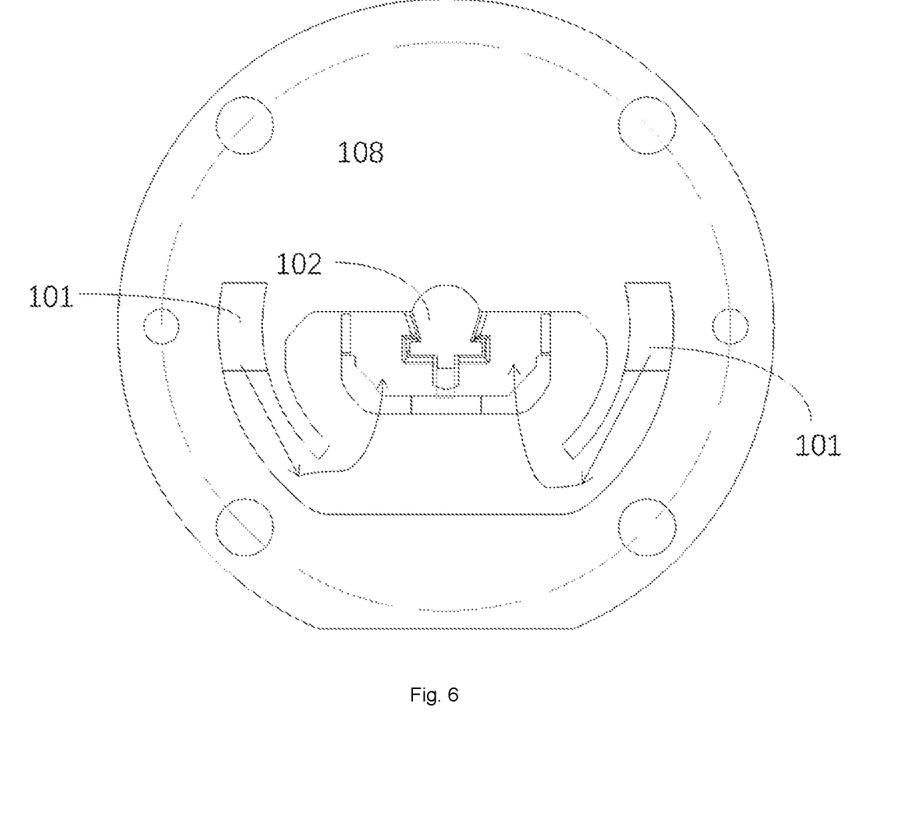
FIG. 6 is a structure schematic view of a third cross-section of the silicone co-extrusion mold for LED light strip in an embodiment of the present disclosure regarding the light blocking adhesive material channel and the diffusion adhesive material channel.

As a preferred embodiment, as shown in FIG. 6, a third sectional structural schematic view of the embodiment of the present disclosure with respect to the light blocking adhesive material channel 101 and the diffusion adhesive material channel 102 is shown, the third sectional structural schematic view being a sectional view of an extruded portion of the plane in which the light blocking adhesive material channel 101 and the diffusion adhesive material channel 102 are located. wherein the light blocking adhesive material channel 101 is distributed on both sides of the circuit board channel 201 and the light blocking adhesive material channel 101 is located on each side of the circuit board channel 201 when it reaches the mounting position, so that the light blocking adhesive material in the light blocking adhesive material channel 101 realizes the blocking of light when the light bead emits light, and wherein the diffusion adhesive material channel 102 is located above the circuit board channel 201, wherein above the circuit board channel 201 is above the location of the lamp bead of the circuit board, so that the diffusion adhesive material in the diffusion adhesive material channel 102 realizes the scattering propagation of the light when the lamp bead emits light.

As a preferred embodiment, as shown by the arrows in FIG. 6, the light blocking adhesive material channel 101 for transmitting light blocking adhesive material ultimately leads to the lower side or both sides of the circuit board channel 201, and the diffusion adhesive material channel 102 for transmitting diffusion adhesive material ultimately leads to the upper side of the circuit board channel 201 in order to realize extruded encapsulation of the circuit board.

As another aspect of embodiments of the present disclosure, embodiments of the present disclosure also provide an LED light strip which is made by a silicone co-extrusion mold for LED light strip as in the above embodiments, or is made by silicone co-extrusion method for led light strip prepared as in the above embodiments.

Figure 7:
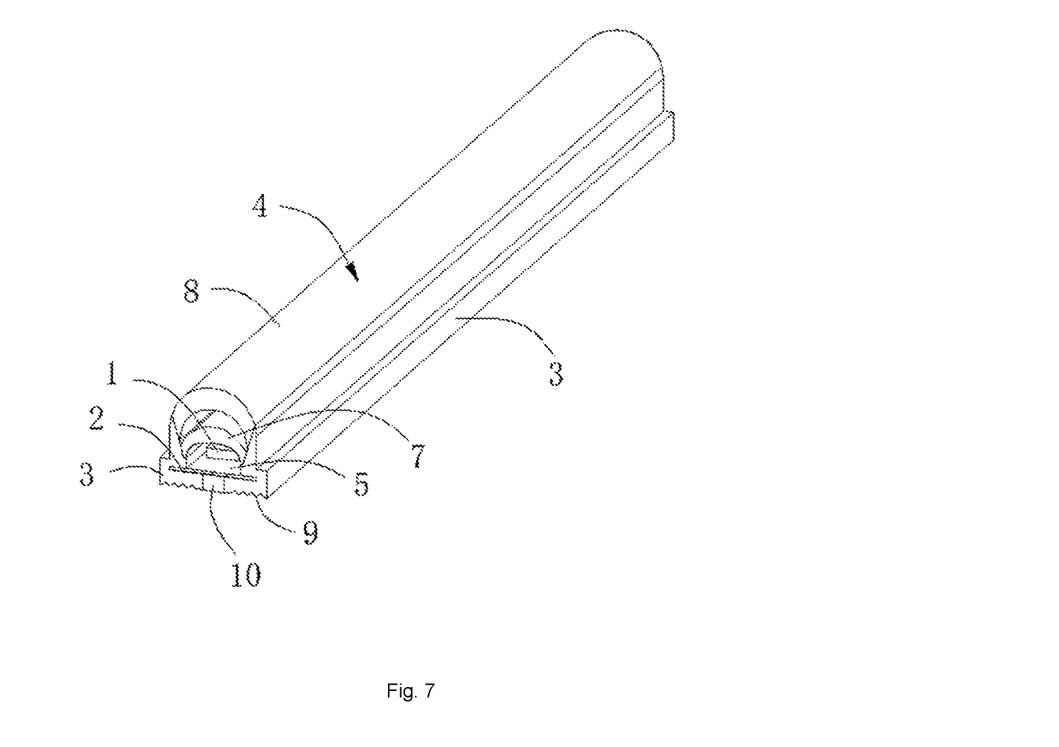
FIG. 7 is a three-dimensional view of an LED surface mounted extrusion structure in an embodiment of the present disclosure.
Figure 8:
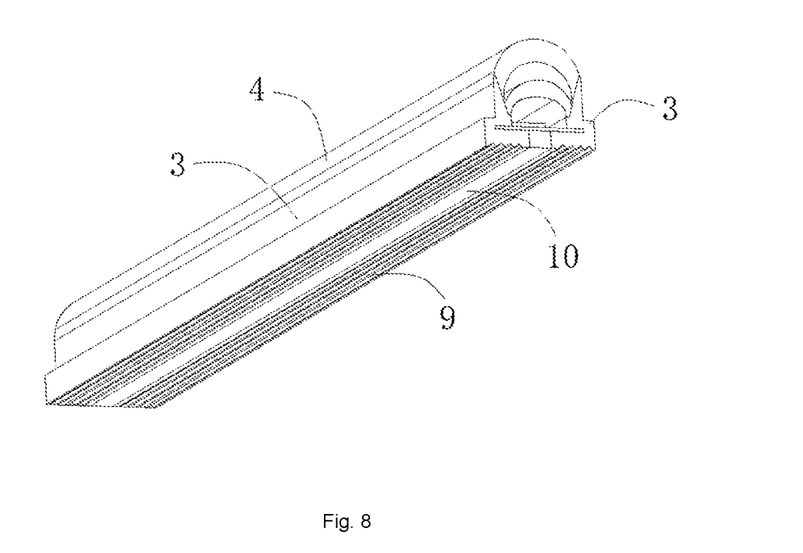
FIG. 8 shows a three-dimensional view of another vision of the LED surface mounted extrusion structure in an embodiment of the present disclosure.
Figure 9:
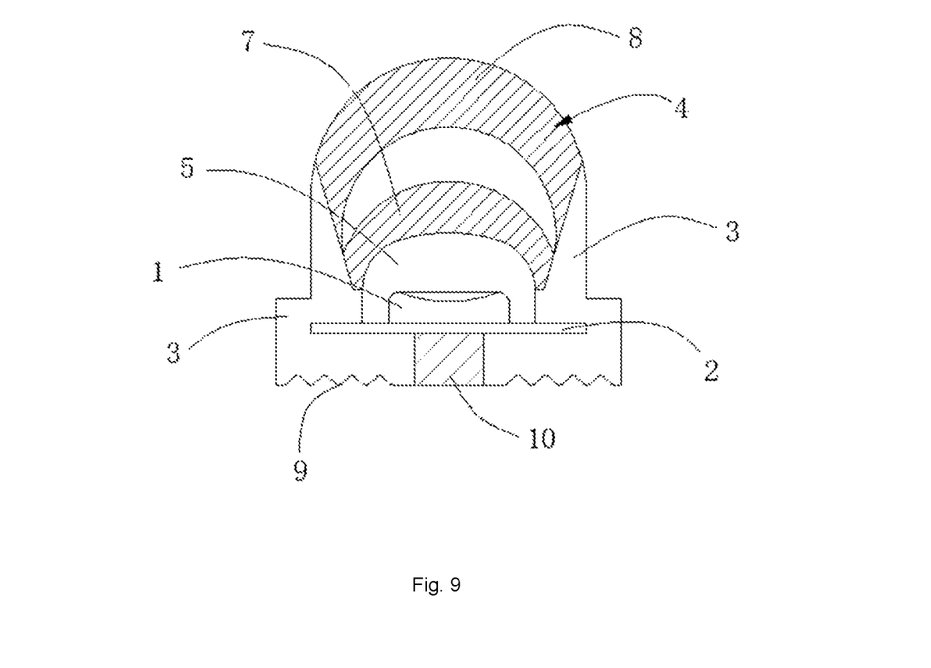
FIG. 9 is a schematic view of a structure of the LED surface mounted extrusion structure in another embodiment of the present disclosure.

As another aspect of the embodiments of the present disclosure, with reference to FIGS. 7 to 9, there is provided a preferred embodiment of the LED surface mounted extrusion structure, comprising: at least one LED lamp bead 1, in the present disclosure, the number of the LED lamp beads 1 is not limited, and can be set according to the actual needs; a lamp plate 2, which supplies power to the LED lamp beads 1 to realize the lighting of the at least one LED lamp bead 1; a light blocking silicone part 3, for realizing blocking the propagation of light at least in a certain angle when the LED lamp beads 1 lighting; light transmitting silicone part 4, for realizing the scattering of light propagation to the outside world at least in a certain angle when the LED lamp beads 1 is lit, wherein the light transmitting silicone part 4 is made of the colored silicone; wherein the light blocking silicone part 3 and the light transmitting silicone part 4 are integrally connected, the light blocking silicone part 3 and the light transmitting silicone part 4 are enclosed to form a cavity 5 that accommodates the lamp plate 2 and at least one LED bead 1. The LED surface mounted extrusion structure of the present disclosure, by setting the light transmitting silicone part 4 and the silicone light blocking part as a one-piece structure, has a better overall appearance, is more concise, and can realize an integration combination of the colored and diffused light, and can be installed and used in an extremely narrow and short space (e.g., the narrowest 3 mm, the shortest 2.5 mm), the light emitting is more uniform, and the light-emitting efficiency is improved, and the thickness is thinner than the traditional process.

In the present disclosure, a manufacturing method in which the light blocking silicone part 3 and the light transmitting silicone part 4 are integrally connected is not limited. In an optional embodiment, it can be that the light blocking silicone part 3 and the light transmitting silicone part 4 are integrally connected by silicone material extrusion molding process through a mold. In other embodiments, it can be that the light blocking silicone part 3 and the light transmitting silicone part 4 are integrally connected by a multiple-drop process through a mold; or it can be that the light blocking silicone part 3 and the light transmitting silicone part 4 are integrally connected by other suitable processes.

As a preferred embodiment of the LED surface mounted extrusion structure in the present disclosure, it can also have the following additional technical features:

Referring to FIGS. 10 to 14, in an optional embodiment, the inner surface of the light transmitting silicone part 4 near the LED lamp bead 1 has a diffusion pattern 6, and the diffusion pattern 6 can diffuse light into the light transmitting silicone part 4 when the LED lamp bead 1 is lit, which is able to improve the full scattering of the light emitted from the LED lamp bead 1 so that the light that passes through the light transmitting silicone part 4 is more uniform, so that the LED surface mounted extrusion structure of the present disclosure has a better luminous effect. Referring to FIG. 9 and FIGS. 15 to 18, in other embodiments, the light transmitting silicone part 4 cannot be provided with the diffusion pattern 6, and in other embodiments, the diffusion pattern 6 can be provided on the outer surface of the light transmitting silicone part 4 that is away from the LED light bead 1.

Figure 15:
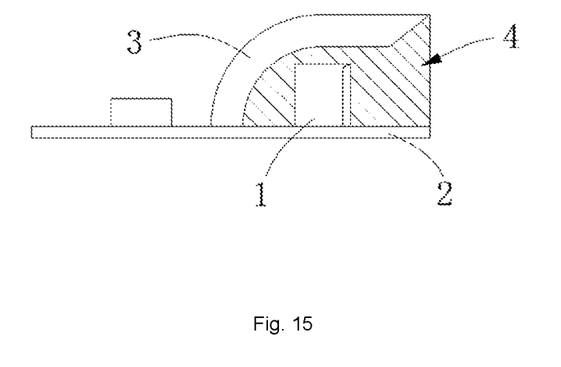
FIG. 15 is a schematic view of the structure of the LED surface mounted extrusion structure in another embodiment of the present disclosure.
Figure 16:
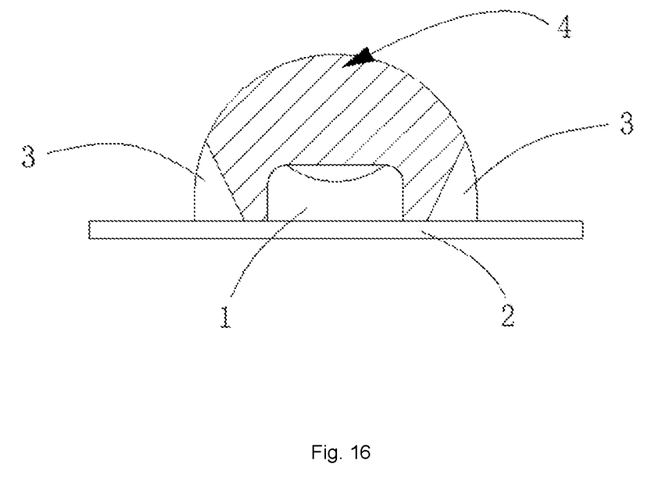
FIG. 16 is a schematic view of the structure of the LED surface mounted extrusion structure in another embodiment of the present disclosure.
Figure 17:
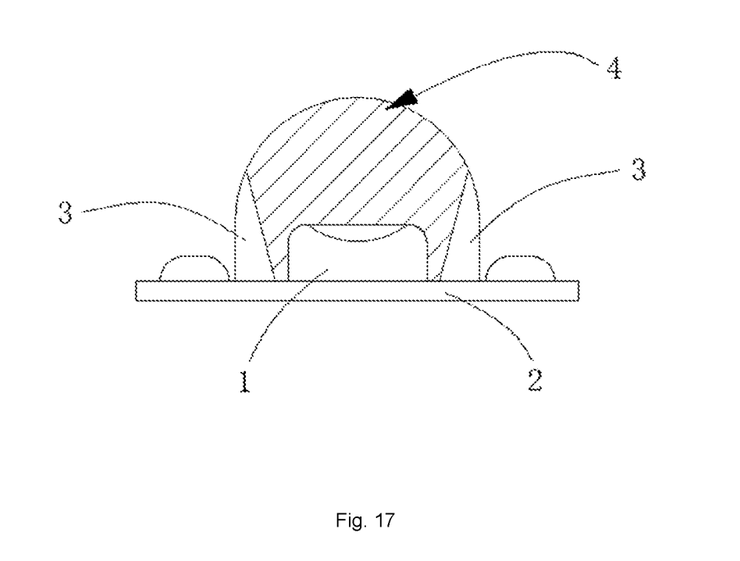
FIG. 17 is a schematic view of the structure of the LED surface mounted extrusion structure in another embodiment of the present disclosure.
Figure 18:
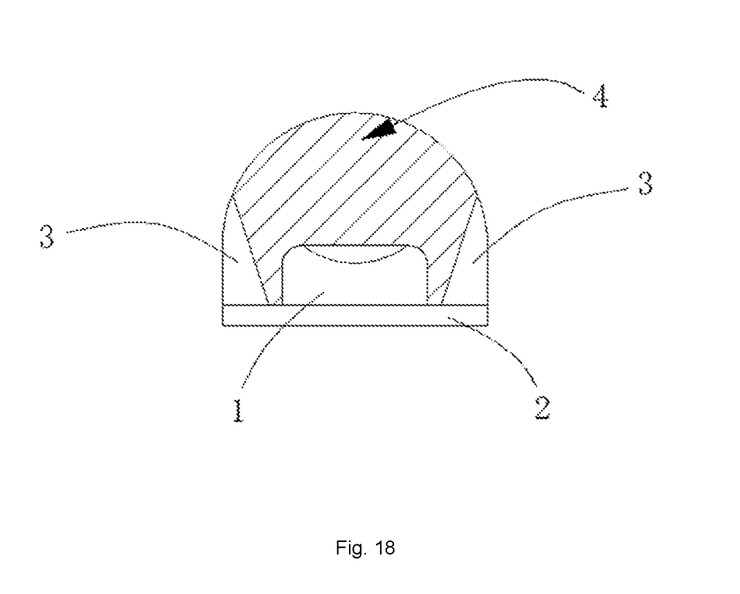
FIG. 18 shows a schematic structural view of the LED surface mounted extrusion structure in another embodiment of the present disclosure.

In an optional embodiment, the outer surface of the light transmitting silicone part 4 away from the LED lamp bead 1 is convex, i.e. has a outer convex shape, which facilitates the realization of light propagation scattering to the outside world when the LED lamp bead 1 is lit, and thus enables the light emitted from the LED lamp bead 1 to be more uniformly emitted from the light transmitting silicone part 4, so that the LED surface mounted extrusion structure of the present disclosure has a better light-emitting effect. Referring to FIG. 15, in other embodiments, it can be that the outer surface of the light transmitting silicone part 4 away from the LED lamp bead 1 is not convex.

In the present disclosure, the shape of the outer surface of the light transmitting silicone part 4 away from the LED lamp bead 1 is not limited, and can be set according to the actual situation. In an optional embodiment, the outer convex shape is arcuate (curved), so as to further improve the uniformity of the light emitted from the LED lamp bead 1 and emitted through the light transmitting silicone part 4, and to further make the luminous effect of the LED surface mounted extrusion structure of the present disclosure better. In other embodiments, it can be that the outer convex shape is planar; it can be that the outer convex shape is irregular; or it can be that the outer convex shape is other suitable shapes.

In some application scenarios, the LED surface mounted extrusion structure in the present disclosure needs to be bent when installing it, therefore, in an optional embodiment, the lamp plate 2 is a flexible circuit board, which makes the lamp plate 2 flexible, and when the LED surface mounted extrusion structure in the present disclosure needs to be bent when installing it, the lamp plate 2 is able to be bent smoothly without being damaged, thereby making the LED surface mounted extrusion structure in the present disclosure applicable to a wider range. In other embodiments, the lamp plate 2 can be a rigid circuit board.

In an optional embodiment, the light blocking silicone part 3 is made of light-impermeable silicone, and the inner surface of the light blocking silicone part 3 close to the LED lamp bead 1 is capable of reflecting the light, so as to enable the light emitted from the LED lamp bead 1 to pass through the light transmitting silicone part 4 more centrally, so as to improve the utilization rate of light emitted from the LED lamp bead 1, and to make the light-emitting effect of the LED surface mounted extrusion structure of the present disclosure better. In other embodiments, it can be that the light blocking silicone part 3 is made of a light transmitting silica gel. In other embodiments, it can be that one part of the light blocking silicone part 3 is made of a light-impermeable silicone and the other part is made of a light-transparent silica gel. referring to FIG. 13, the light blocking silicone part 3 wraps around the light transmitting silicone part 4, and the light blocking silicone part 3 located on the outer surface of the light transmitting silicone part 4 away from the LED lamp bead 1 is made of a light-transparent silica gel.

In an optional embodiment, the colored silicone includes one or more of the following colors or combinations of the following colors: milky white, black, blue, green, orange, yellow, red, purple, in order to achieve a color match with the installation environment of the LED surface mounted extrusion structure, so that the user can select a colored silicone of the appropriate color according to the actual needs, thus the LED surface mounted extrusion structure of the present disclosure can be adapted to more application scenarios.

Figure 10:
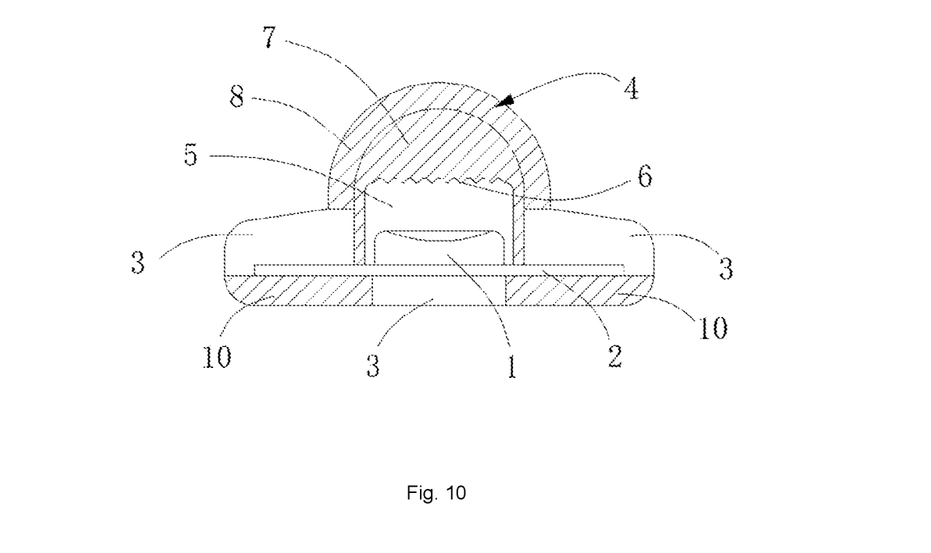
FIG. 10 is a schematic view of a structure of the LED surface mounted extrusion structure in another embodiment of the present disclosure.
Figure 11:
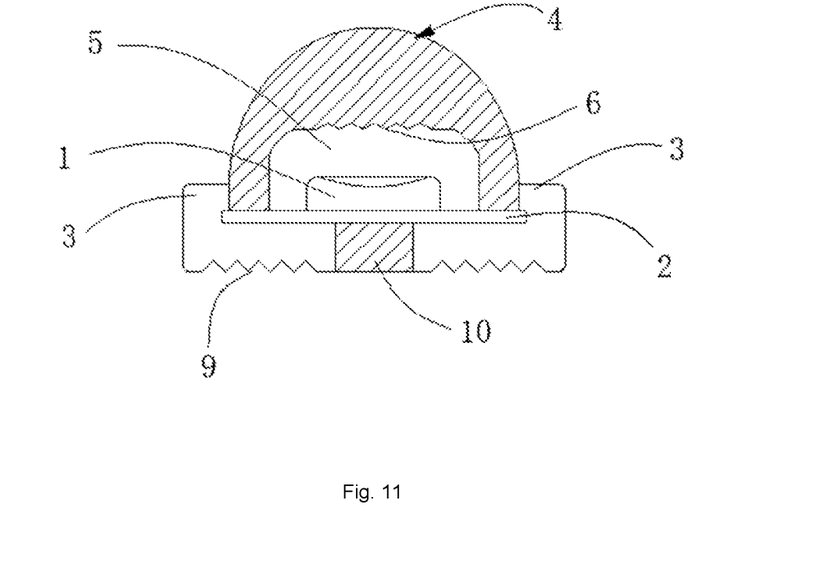
FIG. 11 is a schematic view of the structure of the LED surface mounted extrusion structure in another embodiment of the present disclosure.
Figure 12:
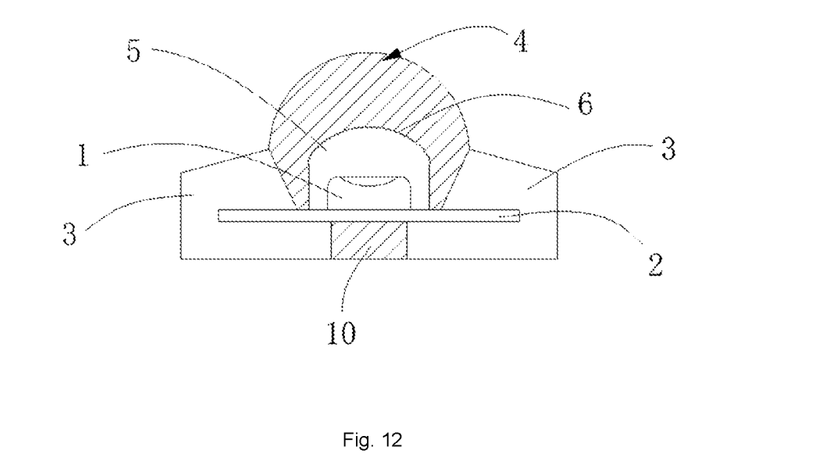
FIG. 12 is a schematic view of the structure of the LED surface mounted extrusion structure in another embodiment of the present disclosure.
Figure 13:
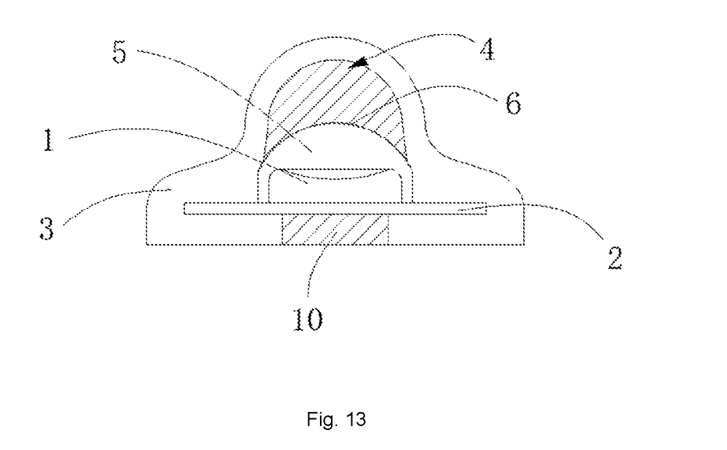
FIG. 13 is a schematic view of the structure of the LED surface mounted extrusion structure in another embodiment of the present disclosure.
Figure 14:
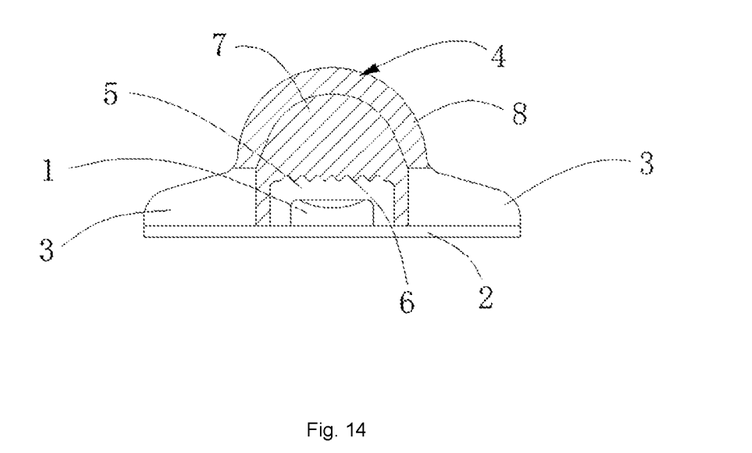
FIG. 14 is a schematic view of the structure of the LED surface mounted extrusion structure in another embodiment of the present disclosure.

In the present disclosure, the structure of the light transmitting silicone part 4 is not limited, and can be set according to the actual needs. Referring to FIG. 9, FIG. 10, and FIG. 14, in an optional embodiment, the light transmitting silicone part 4 includes an internal silicone layer 7 and an external silicone layer 8 wrapping the internal silicone layer 7. With the structure described above, when the external silicone layer 8 of the light transmitting silicone part 4 is broken, the internal silicone layer 7 of the light transmitting silicone part 4 can play a protective role for the LED lamp bead 1 and the lamp plate 2, thereby preventing external water droplets, impurities particles and other substances from contacting the LED lamp bead 1 and the lamp plate 2, reducing the occurrence of damage to the LED lamp bead 1 and the lamp plate 2, and improving the reliability and stability of the LED surface mounted extrusion structure of the present disclosure. Referring to FIGS. 11 to 13 and FIGS. 15 to 18, in other embodiments, it can be the case that the light transmitting silicone part 4 is a single-layer silicone structure.

In an optional embodiment, the number of light transmitting silicone part 4 and the number of light blocking silicone part 3 are greater than or equal to 1, and the light transmitting silicone part 4 and the light blocking silicone part 3 are arbitrarily arranged to enclose a cavity 5 that accommodates the lamp plate 2 and the at least one LED lamp bead 1. In this way, the user can select the right number of light transmitting silicone part 4 and the right number of light blocking silicone part 3 according to the actual needs to get the appropriate LED surface mounted extrusion structure.

In an optional embodiment, the light transmitting silicone part 4 and the light blocking silicone part 3 are provided on the lamp plate 2, and the above structure makes the overall structure of the LED surface mounted extrusion structure of the present disclosure more stable. In other embodiments, it can be that the light transmitting silicone part 4 and the light blocking silicone part 3 are not provided on the lamp plate 2.

Referring to FIGS. 9 to 13, in an optional embodiment, the light transmitting silicone part 4 and the light blocking silicone part 3 wrap around the back surface of the lamp plate 2 where the LED lamp bead 1 is not provided, and the adoption of the above structure can protect the LED lamp bead 1 and the lamp plate 2 more comprehensively, reduce the influence of the outside world on the LED lamp bead 1 and the lamp plate 2, thereby reducing the occurrence of damage to the LED lamp bead 1 and the lamp plate 2, and providing a higher level of safety and reliability. In other embodiments, the light transmitting silicone part 4 and the light blocking silicone part 3 can wrap around a part of the back surface of the lamp plate 2 where the LED light bead 1 is not installed; referring to FIGS. 14 to 18, the light transmitting silicone part 4 and the light blocking silicone part 3 cannot wrap around the back surface of the lamp plate 2 where the LED light bead 1 is not installed.

It is understood that, since the bottom surface of the light blocking silicone part 3 will have a belt mark during the manufacturing process of the LED surface mounted extrusion structure, resulting in the LED surface mounted extrusion structure not being aesthetically pleasing enough, therefore, referring to FIGS. 7 to 9, and FIG. 5, in an optional embodiment, a concave-convex structure 9 is provided at the bottom surface of the light blocking silicone part 3, and on the one hand, the provision of the concave-convex structure 9 is capable of removing the belt mark of the bottom surface of the light blocking silicone part, which makes the LED surface mounted extrusion structure of the present disclosure more aesthetically pleasing, and on the other hand, it can save the manufacturing material of the light blocking silicone part 3. FIG. 10, FIG. 12, and FIG. 13, in other embodiments, it is possible that the bottom surface of the light blocking silicone part 3 is not provided with the concave-convex structure 9; it is also possible that the bottom surface of the light blocking silicone part 3 is provided with other suitably shaped structures for removing the belt marks.

Referring to FIGS. 7 to 13, in an optional embodiment, the light blocking silicone part 3 is provided with a transparent strip 10 with which it is capable of observing the cutting line on the lamp plate 2, so as to enable the user to see the cutting line on the lamp plate 2 clearly, and thus to be able to more accurately cut the LED surface mounted extrusion structure of the present disclosure according to the actual needs. Referring to FIGS. 14 to 18, in other embodiments, the light blocking silicone part 3 cannot be provided with the transparent strip 10; and other suitable structures or components can be provided on the light blocking silicone part 3 instead of the transparent strip 10.

On the premise of no conflict, the person skilled in the art can freely combine as well as superimpose the above additional technical features.

Embodiments of the present disclosure also provide an LED light strip comprising: the above-described LED surface mounted extrusion structure. Since the LED light strip of the present disclosure embodiments includes the above-described LED surface mounted extrusion structure, the light transmitting silicone part 4 and the light blocking silicone part is set as an integrated structure, so the appearance appears to be better in a holistic manner and more concise, and it can realize integration combination of the colored and diffused light, and can be installed and used in an extremely narrow and short space (e.g., the narrowest 3 mm, the shortest 2.5 mm), the light emitting is more uniform, and the light-emitting efficiency is improved, and the thickness is thinner than the traditional process.

The above mentioned embodiments are only to express the implementation of the present disclosure, the description is more specific and detailed, but not to be construed as a limitation of the patent scope of the present disclosure. It should be pointed out that, for ordinary skilled in the art, without departing from the conception of the present disclosure, a number of deformations, equivalent substitutions, improvements, etc., can be made, which all fall within the scope of protection of the present disclosure. Therefore, the scope of protection of the presently disclosed patent shall be subject to the appended claims.

The invention claimed is:

1. A silicone co-extrusion method for LED light strip, comprising the following steps:
   Obtaining an elongated adhesive material, the elongated adhesive material comprising a light blocking adhesive material and a diffusion adhesive material;
   Feeding the light blocking adhesive material, the diffusion adhesive material and a circuit board with a light bead into a light blocking adhesive material channel, a diffusion adhesive material channel and a circuit board channel in a mold, respectively, and extruding the fed light blocking adhesive material and diffusion adhesive material by means of silicone co-extrusion to a silicone light bar outlet to realize forming the light blocking adhesive material and diffusion adhesive material on the circuit board to obtain a silicone light bar;
   Heating and shaping the silicone light bar extruded from the mold to obtain the LED light strip, wherein the mold has a light blocking adhesive material channel, a diffusion adhesive material channel, a circuit board channel, and a silicone light bar outlet, wherein the light blocking adhesive material channel, the diffusion adhesive material channel, and the circuit board channel are connected to the silicone light bar outlet,
   wherein while feeding the light blocking adhesive material, diffusion adhesive material and circuit board with light beads into the light blocking adhesive material channel, the diffusion adhesive material channel and the circuit board channel in the mold, it further comprises: feeding a transparent cutting line adhesive material into the cutting line adhesive material channel in the mold to achieve forming the transparent cutting line adhesive material on a bottom of the circuit board to facilitate seeing the cutting line on the bottom of the circuit board.

2. The silicone co-extrusion method for LED light strip according to claim 1, wherein the obtaining an elongated adhesive material comprises: fully mixing a vulcanizing agent with the silicone raw material to obtain a refining adhesive; and cutting the refining adhesive into elongated strips to form the elongated adhesive material.

3. The silicone co-extrusion method for LED light strip according to claim 1, wherein the heating and shaping the silicone light bar extruded from the mold to obtain the LED light strip comprises: entering the silicone light bar into a tunnel oven for heating to achieve vulcanization and shaping to obtain the LED light strip.

4. A silicone co-extrusion mold for LED light strip, comprising a co-extrusion section and a circuit board feeding section, the co-extrusion section being provided with a light blocking adhesive material channel, a diffusion adhesive material channel and a silicone light bar outlet; the light blocking adhesive material channel and the diffusion adhesive material channel being provided on a mounting surface of the co-extrusion section, the silicone light bar outlet being set on an output surface of the co-extrusion section; wherein the circuit board feeding section is vertically connected to the mounting surface of the co-extrusion section, the interiors of the circuit board feeding section and the co-extrusion section are provided with a circuit board channel, and the circuit board channel is perpendicular to the mounting surface and runs through the circuit board feeding section and the co-extruding section; the light blocking adhesive material channel, the diffusion adhesive material channel, and the circuit board channel all are in mounting positions which are before the silicone light bar outlet, and by means of co-extrusion, the light blocking adhesive material, the diffusion adhesive material, and the circuit board are co-extruded to form a silicone light bar at the silicone light bar outlet, wherein the mounting surface of the co-extrusion section is further provided with a cutting line adhesive material inlet, the cutting line adhesive material inlet is connected to the mounting position to realize mounting on a bottom of the circuit board during co-extrusion.

5. The silicone co-extrusion mold for LED light strip according to claim 4, wherein the circuit board feeding section further comprises an air inlet hole connected to the silicone light bar outlet.

6. The silicone co-extrusion mold for LED light strip according to claim 4, wherein one end of the circuit board feeding section away from the co-extrusion section is provided with an external thread.

7. The silicone co-extrusion mold for LED light strip according to claim 4, wherein one end of the circuit board feeding section near the co-extrusion section is provided with an insertion structure inserted into the co-extrusion section and reaching the silicone light bar outlet;
   and/or, the mounting surface of the co-extrusion section is distributed with threaded holes running through to the output surface to fix the co-extrusion section 100.

8. The silicone co-extrusion mold for LED light strip according to claim 4, wherein the light blocking adhesive material channel is distributed on both sides of the circuit board channel, and the light blocking adhesive material channel is located on each side of the circuit board channel when it reaches a mounting position, so that the light blocking adhesive material in the light blocking adhesive material channel realizes the blocking of light when the light bead emits light, and the diffusion adhesive material channel is located above the circuit board channel, so that the diffusion adhesive material in the diffusion adhesive material channel realizes the scattering propagation of the light when the lamp bead emits light.

9. A surface mounted extrusion structure for LED light strip, wherein it comprises:
at least one LED light bead;
a lamp plate, for supplying power to the LED light bead to realize the lighting of the at least one LED light bead;
a light blocking silicone part, for realizing blocking the propagation of light at least at a certain angle when the LED light bead is lit;
a light transmitting silicone part, for realizing a scattering of light propagation to an outside world at least at a certain angle when the LED light bead is lit, wherein the light transmitting silicone part is made of a colored silicone;
Wherein, the light blocking silicone part and the light transmitting silicone part are integrally connected, and the light blocking silicone part and the light transmitting silicone part are enclosed to form a cavity accommodating the lamp plate and the at least one LED lamp bead,
Wherein the light blocking silicone part is provided with a transparent strip capable of observing a cutting line on the lamp plate.

10. The surface mounted extrusion structure for LED light strip according to claim 9, wherein an inner surface of the light transmitting silicone part near the LED light bead has a diffusion pattern, the diffusion pattern is capable of scattering and spreading light into the light transmitting silicone part when the LED light bead is lit.

11. The surface mounted extrusion structure for LED light strip according to claim 9, wherein an outer surface of the light transmitting silicone part away from the LED lamp bead has an outer convex shape, which facilitates the realization of light propagation scattering to an outside world when the LED lamp bead 1 is lit.

12. The surface mounted extrusion structure for LED light strip according to claim 11, wherein the outer convex shape is arcuate.

13. The surface mounted extrusion structure for LED light strip according to claim 9, wherein the lamp plate is a flexible circuit board.

14. The surface mounted extrusion structure for LED light strip according to claim 9, wherein the light blocking silicone part is made of light-impermeable silicone, and an inner surface of the light blocking silicone part close to the LED lamp bead is capable of reflecting the light.

15. The surface mounted extrusion structure for LED light strip according to claim 9, wherein the colored silicone includes one or more of the following colors or combinations of the following colors: milky white, black, blue, green, orange, yellow, red, purple, in order to achieve a color match with the installation environment of the LED surface mounted extrusion structure.

16. The surface mounted extrusion structure for LED light strip according to claim 9, wherein the light transmitting silicone part includes an internal silicone layer and an external silicone layer wrapping the internal silicone layer.

17. The surface mounted extrusion structure for LED light strip according to claim 9, wherein a number of the light transmitting silicone part and a number of the light blocking silicone part are greater than or equal to 1, and the light transmitting silicone part and the light blocking silicone part are arbitrarily arranged to enclose a cavity that accommodates the lamp plate and the at least one LED lamp bead.

18. The surface mounted extrusion structure for LED light strip according to claim 9, wherein the light transmitting silicone part and the light blocking silicone part are provided on the lamp plate.

19. The surface mounted extrusion structure for LED light strip according to claim 9, wherein the light transmitting silicone part and the light blocking silicone part wrap around a back surface of the lamp plate where the LED lamp bead is not provided;
and/or, a concave-convex structure is provided on a bottom surface of the light blocking silicone part.

* * * * *